United States Patent
Daccord

(10) Patent No.: US 9,403,314 B2
(45) Date of Patent: Aug. 2, 2016

(54) EQUIPMENT FOR PREPARING CURVED FIBERS

(71) Applicant: Schlumberger Technology Corporation, Sugar Land, TX (US)

(72) Inventor: Gerard Daccord, Thézan les Béziers (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/056,949

(22) Filed: Oct. 18, 2013

(65) Prior Publication Data

US 2014/0045731 A1 Feb. 13, 2014

Related U.S. Application Data

(62) Division of application No. 12/890,969, filed on Sep. 27, 2010, now Pat. No. 8,617,444.

(30) Foreign Application Priority Data

Oct. 2, 2009 (EP) ..................................... 09290762

(51) Int. Cl.
| | |
|---|---|
| B29C 53/62 | (2006.01) |
| B29C 53/82 | (2006.01) |
| B29B 15/08 | (2006.01) |

(Continued)

(52) U.S. Cl.
CPC ................. *B29C 53/62* (2013.01); *B29B 15/08* (2013.01); *B29C 53/02* (2013.01); *B29C 53/825* (2013.01); *C09K 8/03* (2013.01); *C09K 8/035* (2013.01); *C09K 8/42* (2013.01); *C09K 8/487* (2013.01); *C09K 8/56* (2013.01); *C09K 8/70* (2013.01); *C09K 8/92* (2013.01); *B29C 53/845* (2013.01); *B29C 2793/009* (2013.01); *B29L 2031/731* (2013.01); *C09K 2208/08* (2013.01)

(58) Field of Classification Search
CPC ............ D02G 1/04; D02G 1/06; B29C 53/62; B29C 53/825
See application file for complete search history.

(56) References Cited

U.S. PATENT DOCUMENTS

| | | | |
|---|---|---|---|
| 3,431,337 | A | 3/1969 | Heimberger |
| 4,083,407 | A | 4/1978 | Griffin et al. |

(Continued)

FOREIGN PATENT DOCUMENTS

| | | |
|---|---|---|
| EP | 0721050 A2 | 7/1996 |
| EP | 0735235 B1 | 10/2000 |

(Continued)

OTHER PUBLICATIONS

Abbas et al., "A Safety Net for Controlling Lost Circulation", Oilfield Review, Vol. 15, Issue 4, Winter 2003/2004, pp. 20-27.
Ahmed et af, "Fiber Sweeps for Hole Cleaning", SPE 113746 presented at the 2008 SPE/ICoTA Coiled Tubing and Nell Intervention Conference and Exhibition, The Woodlands, Texas, USA, Apr. 1-2, 2008, 12 pages.
Alava et al., "The Physics of Paper", Reports on Progress in Physics, vol. 69, No. 3, Mar. 2006, pp. 669-723.
Armstrong et al., "Advanced Fracturing Fluids Improve Well Economics", Oilfield Review, vol. 7, Issue 3, Autumn 1995, pp. 34-51.
Bivins et al., "New Fibers for Hydraulic Fracturing", Oilfield Review, vol. 17, Issue 2, Summer 2005, pp. 34-43.

(Continued)

*Primary Examiner* — Benjamin Schiffman
(74) *Attorney, Agent, or Firm* — Andrea E. Tran

(57) ABSTRACT

The invention is related in general to equipment and methods for preparing curved fibers in a batch or continuous process. Fiber strands comprising a thermoplastic material are placed on a cylindrical surface and heated such that they soften and become malleable. The fiber strands assume the curvature of the cylindrical surface and, upon cooling below their softening temperature, retain the curvature. The curved-fiber strands are then cut to a desired length.

20 Claims, 2 Drawing Sheets

(51) Int. Cl.
*B29C 53/02* (2006.01)
*C09K 8/03* (2006.01)
*C09K 8/487* (2006.01)
*C09K 8/70* (2006.01)
*C09K 8/035* (2006.01)
*C09K 8/42* (2006.01)
*C09K 8/56* (2006.01)
*C09K 8/92* (2006.01)
*B29C 53/84* (2006.01)
*B29L 31/00* (2006.01)

(56) References Cited

U.S. PATENT DOCUMENTS

| | | |
|---|---|---|
| 4,349,490 A | 9/1982 | Bos |
| 4,391,925 A | 7/1983 | Mintz et al. |
| 4,439,328 A | 3/1984 | Moity |
| 4,836,940 A | 6/1989 | Alexander |
| 5,027,900 A | 7/1991 | Wilson |
| 5,167,891 A | 12/1992 | Dijkman, Sr. et al. |
| 5,330,005 A | 7/1994 | Card et al. |
| 5,339,902 A | 8/1994 | Harris et al. |
| 5,377,760 A | 1/1995 | Merrill |
| 5,439,055 A | 8/1995 | Card et al. |
| 5,501,274 A | 3/1996 | Nguyen et al. |
| 5,501,275 A | 3/1996 | Card et al. |
| 5,582,249 A | 12/1996 | Caveny et al. |
| 5,697,440 A | 12/1997 | Weaver et al. |
| 5,782,300 A | 7/1998 | James et al. |
| 5,904,208 A | 5/1999 | Ray et al. |
| 6,016,871 A | 1/2000 | Burts |
| 6,016,879 A | 1/2000 | Burts |
| 6,074,592 A * | 6/2000 | Shea ............................ 264/281 |
| 6,172,011 B1 | 1/2001 | Card et al. |
| 6,218,343 B1 | 4/2001 | Burts |
| 6,221,152 B1 | 4/2001 | Dial et al. |
| 6,283,213 B1 | 9/2001 | Chan et al. |
| 6,365,253 B1 | 4/2002 | Primeau et al. |
| 6,450,260 B1 | 9/2002 | James et al. |
| 6,599,863 B1 | 7/2003 | Palmer et al. |
| 6,716,798 B1 | 4/2004 | Burts |
| 6,732,800 B2 | 5/2004 | Acock et al. |
| 6,837,309 B2 | 1/2005 | Boney et al. |
| 6,867,170 B1 | 3/2005 | Burts |
| 6,927,194 B2 | 8/2005 | Burts |
| 6,932,158 B2 | 8/2005 | Burts |
| 6,938,693 B2 | 9/2005 | Boney et al. |
| 6,939,833 B2 | 9/2005 | Burts |
| 6,976,537 B1 | 12/2005 | Verret |
| 7,192,541 B2 | 3/2007 | Ardouin |
| 7,275,596 B2 | 10/2007 | Willberg et al. |
| 7,297,662 B2 | 11/2007 | Verret |
| 7,306,041 B2 | 12/2007 | Milne et al. |
| 7,350,572 B2 | 4/2008 | Fredd et al. |
| 7,380,600 B2 | 6/2008 | Willberg et al. |
| 7,380,601 B2 | 6/2008 | Willberg et al. |
| 7,398,829 B2 | 7/2008 | Hutchins et al. |
| 7,482,311 B2 | 1/2009 | Willberg et al. |
| 7,841,850 B2 | 11/2010 | Mottahedeh et al. |
| 2002/0040812 A1 | 4/2002 | Heying |
| 2002/0157575 A1 | 10/2002 | DiLullo et al. |
| 2004/0020651 A1 | 2/2004 | Burts et al. |
| 2004/0162356 A1 | 8/2004 | Willberg et al. |
| 2004/0182577 A1 | 9/2004 | Chatterji et al. |
| 2005/0175654 A1 | 8/2005 | Willberg et al. |
| 2006/0000612 A1 | 1/2006 | Reddy et al. |
| 2006/0042797 A1 | 3/2006 | Fredd et al. |
| 2006/0096759 A1 | 5/2006 | Reddy et al. |
| 2006/0157248 A1 | 7/2006 | Hoefer et al. |
| 2006/0174802 A1 | 8/2006 | Bedel et al. |
| 2006/0175060 A1 | 8/2006 | Reddy et al. |
| 2006/0254770 A1 | 11/2006 | Hou |
| 2007/0056730 A1 | 3/2007 | Keese et al. |
| 2007/0129262 A1 | 6/2007 | Gurmen et al. |
| 2007/0281869 A1 | 12/2007 | Drochon et al. |
| 2008/0023205 A1 | 1/2008 | Craster et al. |
| 2008/0060811 A1 | 3/2008 | Bour et al. |
| 2008/0093073 A1 | 4/2008 | Bustos et al. |
| 2008/0110627 A1 | 5/2008 | Keese et al. |
| 2008/0135242 A1 | 6/2008 | Lesko et al. |
| 2008/0234147 A1 | 9/2008 | Li et al. |
| 2008/0236832 A1 | 10/2008 | Fu et al. |
| 2008/0245527 A1 | 10/2008 | Leugemors et al. |
| 2009/0032252 A1 | 2/2009 | Boney et al. |
| 2009/0044945 A1 | 2/2009 | Willberg et al. |
| 2009/0054269 A1 | 2/2009 | Chatterji et al. |
| 2009/0095475 A1 | 4/2009 | Ravi et al. |
| 2010/0288495 A1 | 11/2010 | Willberg et al. |
| 2010/0307747 A1 | 12/2010 | Shindgikar et al. |
| 2011/0082058 A1 | 4/2011 | Daccord |
| 2012/0322695 A1 | 12/2012 | Kefi et al. |

FOREIGN PATENT DOCUMENTS

| | | |
|---|---|---|
| EP | 0619415 B1 | 1/2002 |
| EP | 0783073 B1 | 11/2002 |
| EP | 834644 B1 | 12/2004 |
| EP | 1165936 B1 | 3/2006 |
| EP | 1284248 B1 | 8/2008 |
| EP | 1789650 B1 | 11/2008 |
| EP | 2085447 A1 | 8/2009 |
| EP | 2305767 A1 | 4/2011 |
| JP | 58145411 A | 8/1983 |
| WO | 03042495 A1 | 5/2003 |
| WO | 2005059058 A2 | 6/2005 |
| WO | 2006003637 A1 | 1/2006 |
| WO | 2009079231 A2 | 6/2009 |
| WO | 2009079234 A2 | 6/2009 |
| WO | 2009083236 A1 | 7/2009 |
| WO | 2009083238 A1 | 7/2009 |
| WO | 2009088317 A1 | 7/2009 |

OTHER PUBLICATIONS

Burger et al., "Digital Image Processing—An Algorithmic Introduction using Java", Springer, ISBN 978-1-84628-379-6, 2008.

Daccord et al., "Cement-Formation Interactions", Nelson E. B. and Guillot D. (eds.): Well Cementing—2nd Edition, Houston: Schlumberger, 2006, pp. 191-232.

Daccord et al., "Mud Removal", Nelson EB and Guillot D (eds.): Well Cementing—2nd Edition, Houston: Schlumberger, 2006, pp. 143-189.

Hubbe, "Flocculation and Redispersion of Cellulosic Fiber Suspensions: A Review of Effects of Hydrodynamic Shear and Polyelectrolytes", BioResources, vol. 2, No. 2, 2007, pp. 296-331.

Joung et al., "Viscosity of Curved Fibers in Suspension", Journal of Non-Newtonian Fluid Mechanics, vol. 102, Issue 1, 2002, pp. 1-17.

Nigam, "Challenges in Pulp Processing", 12th ERCOFTAC NPC Meeting, Retrieved from the Internet: URL: http//www.mech.kth.se/ercoftac/events/NPC12/presentations/Thursday/Nigam/pdf [retrieved on Sep. 5, 2010], May 29-30, 2008, pp. 1-19.

Parker et al., "An Evaluation of a Primary Cementing Technique Using Low Displacement Rates", SPE 1234 presented at the 40th Annual Fall Meeting of the Society of Petroleum Engineers of AIME, Denver, Colorado, Oct. 3-6, 1965, 7 pages.

Piot et al., "Primary Cementing Techniques", Nelson EB and Guillot D (eds.): Well Cementing—2nd Edition, Houston: Schlumberger, 2006, pp. 459-501.

Roussel et al., "Fifty-Cent Rheometer for Yield-Stress Measurements: From Slump to Spreading Flow", Journal of Rheology, vol. 49, Issue 3, 2005, pp. 705-718.

Ku et al., "Characteristics of Fiber Suspension Flow in a Rectangular Channel", International Journal of Multiphase Flow, vol. 31, Issue 3, 2005, pp. 318-336.

* cited by examiner

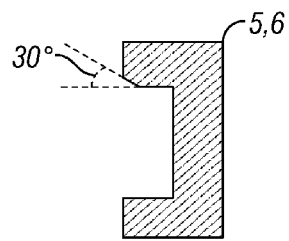
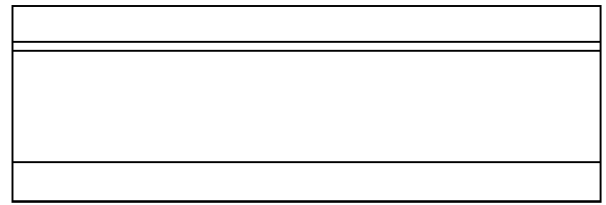
FIG. 3A    FIG. 3B
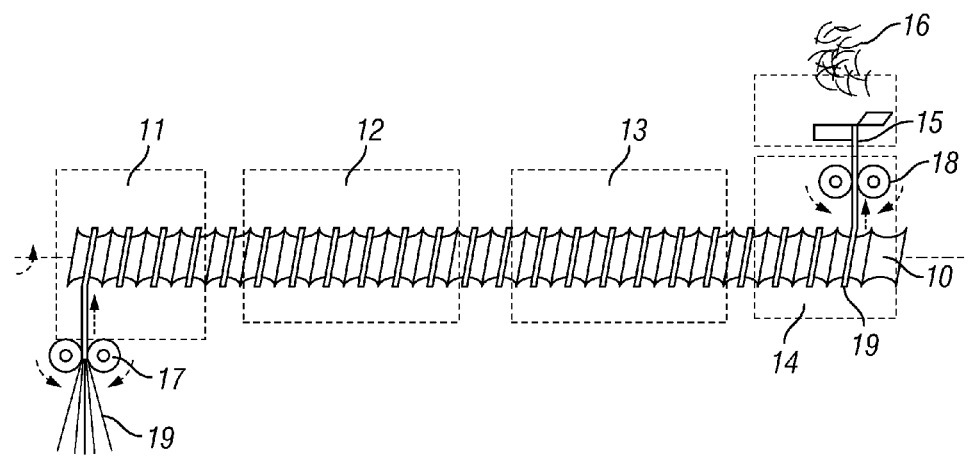
FIG. 4

EQUIPMENT FOR PREPARING CURVED FIBERS

CROSS REFERENCE TO RELATED APPLICATIONS

The current application is a divisional of U.S. application Ser. No. 12/890,969, filed on Sep. 27, 2010 and published on Apr. 7, 2011 as US2011/0082058, the entire content of which is hereby incorporated by reference into the current application.

BACKGROUND OF THE INVENTION

The statements in this section merely provide background information related to the present disclosure and may not constitute prior art.

The invention is related in general to equipment and methods for preparing curved fibers.

The inclusion of fibers in fluids for servicing subterranean wells has become a well-known practice. For example, fibers are added to drilling fluids to help minimize lost circulation. Similarly, fibers may be added to cement slurries to help minimize lost circulation; fibers can also improve flexural strength of set cement. In hydraulic fracturing operations, fibers may be added to proppant to help prevent proppant flowback as the well produces. Fibers are also used to improve the solids-carrying capacity of fluids as they are pumped downhole for various purposes.

A thorough presentation of the use of fibers in well-service fluids may be found in the following publications.

Armstrong K. et al.: "Advanced Fracturing Fluids Improve Well Economics," *Oilfield Review* 7, no. 3 (Autumn 1995): 34-51.

Abbas R. et al.: "A Safety Net for Controlling Lost Circulation," *Oilfield Review* 15, no. 4 (Winter 2003/2004): 20-27.

Bivins C. et al.: "New Fibers for Hydraulic Fracturing," *Oilfield Review* 17, no. 2 (Summer 2005): 34-43.

Daccord G. et al.: "Cement-Formation Interactions," in Nelson E. B. and Guillot D. (eds.): *Well Cementing-2$^{nd}$ Edition*, Houston: Schlumberger (2006): 191-232.

More recently, it has been discovered that fluids containing fibers (also known as fiber laden fluids) may be used as plugs that prevent the commingling of two other well-service fluids in a tubular body. For example, a fiber-laden fluid may be used to prevent contact between drilling fluid and a cement slurry—fluids that are often incompatible and would cause operational problems should they commingle.

Until now, fibers employed in well-service fluids have been linear; that is, the length of the fiber extends along a straight or nearly straight line. However, it has been discovered that curved fibers have utility in the domain of well-service fluids. This type of fibers is also documented in copending patent application n° EP09290761.7 to Services Petroliers Schlumberger.

In civil engineering, so-called "curved fibers", available, for example, from CNBM International Corporation, 5/F, Longbo Building, 3 Nanlishi Rd., Xicheng District, Beijing City, China, under the product name "Curved Polymer Fibre" are used for the reinforcement of concrete. However, such curved fibers are crimped or twisted in a helical pattern along their length. The bulk fiber shape is still linear, because the helix extends in a straight line.

It therefore remains desirable to have equipment and methods by which curved fibers may be prepared.

SUMMARY OF THE INVENTION

The present invention solves the problems mentioned herein.

In a first aspect, the invention pertains to an apparatus for preparing curved fibers in batches. Views of a preferred embodiment of the apparatus are presented in FIGS. 1-3.

In a second aspect, the invention relates to an apparatus for preparing curved fibers continuously. A view of a preferred embodiment of the apparatus is presented in FIG. 4.

The invention also aims at a batch method for preparing curved fibers. The first aspect of the invention is employed to perform the method.

Also disclosed is a continuous method for preparing curved fibers. The second aspect of the invention is employed to perform the method. A cylindrical screw feeder is selected whose diameter between the threads provides a desired curvature. One or more continuous strands of fiber are also selected. Before operating the apparatus, it is first necessary to thread the fiber strands throughout the entire mechanism. In the rolling zone, the fiber strand passes through the opposing wheels and continues between the threads of the screw feeder until it reaches the unrolling zone, whereupon the fiber strands are guided off the screw feeder through opposing wheels and then fed into the cutting means.

The fibers suitable to be used in the present invention have a workability-temperature range, defined herein as a temperature higher than the softening temperature (often the glass-transition temperature) of the fiber composition, and lower than the melting point of the fiber composition. For fiber compositions that do not melt, the upper limit is the decomposition temperature of the fiber composition. When heated to a temperature within the workability-temperature range, the fiber becomes malleable and assumes the curvature of the cylindrical surface. When cooled to a temperature below the softening temperature, the fiber is no longer malleable and therefore maintains the curvature.

Then, in the context of the present invention, fiber diameters up to about 300 micrometers may be employed; however, diameters between 100 to 300 micrometers are preferred and diameters between 200 and 280 micrometers are even more preferred. The curved-fiber length after cutting may be between about 1 mm and 50 mm, more preferably between 5 mm to 20 mm and most preferably between 10 mm to 20 mm. The Feret length of the fibers, defined as the straight-line distance between each end of the curved fiber, may be between 5 mm and 30 mm. In addition, the curvature radius of the fibers may be between about 5 mm and 50 mm.

BRIEF DESCRIPTION OF THE DRAWINGS

FIGS. 3A and 3B show views of an armature bracket employed in the apparatus to prepare curved fibers in batches FIG. 4 is a diagram of an apparatus for preparing curved fibers continuously.

DETAILED DESCRIPTION

As mentioned earlier, the present invention relates to apparatuses and methods for manufacturing curved fibers that are especially suitable for well application. An even more preferred application is the use of the present curved fibers in fluids employed during various operations performed during the construction and treatment of subterranean wells. Appropriate well-service fluids include (but are not limited to) drilling fluids, cement slurries, spacer fluids, chemical washes, completion fluids, acidizing fluids, fracturing fluids and gravel-pack fluids.

The fibers envisioned for use in all aspects of the invention may comprise (but are not limited to) thermoplastic materials such as those in the following list: acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene, terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile. Of these, polyolefins, polyamides and polyesters are preferred.

Fibers suitable for being use in the present invention have a "workability-temperature range", defined herein as a temperature range higher than the softening temperature (often the glass-transition temperature) of the fiber composition, and lower than the melting point of the fiber composition. For fiber compositions that do not melt, the upper limit is the decomposition temperature of the fiber composition. When heated to a temperature within the workability-temperature range, the fiber becomes malleable and assumes the curvature of the cylindrical surface. When cooled to a temperature below the softening temperature, the fiber is no longer malleable and therefore maintains the curvature.

After that, the present invention preferably involves fibers with diameters up to about 300 micrometers; however, diameters between 100 to 300 micrometers are preferred and diameters between 200 and 280 micrometers are even more preferred. The curved-fiber length after cutting may be between about 1 mm and 50 mm, more preferably between 5 mm to 20 mm and most preferably between 10 mm to 20 mm. The Feret length of the fibers, defined as the straight-line distance between each end of the curved fiber, may be between 5 mm and 30 mm. In addition, the curvature radius of the fibers may be between about 5 mm and 50 mm.

Figure 1:
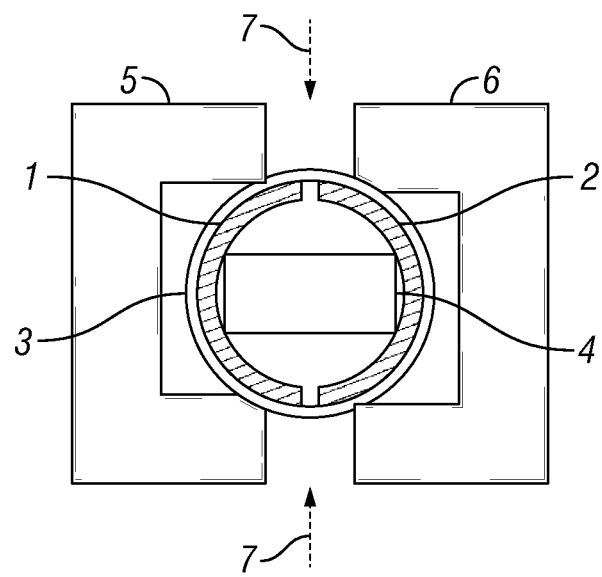
FIG. 1 is a cross-sectional view of an apparatus to prepare curved fibers in batches.
Figure 2:
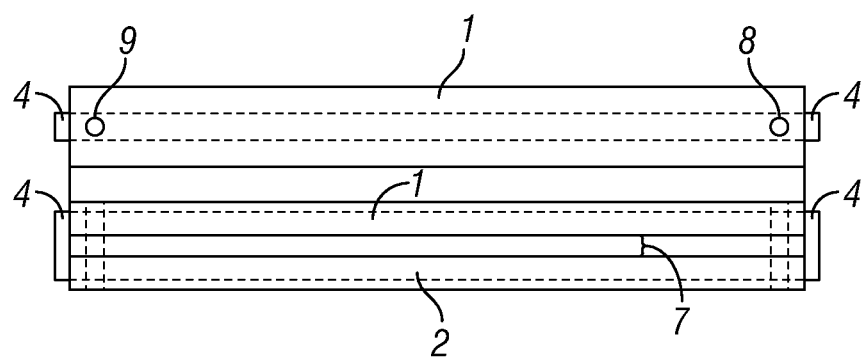
FIG. 2 shows how the half cylinders and spacing rod are arranged in the apparatus to prepare curved fibers in batches.

The first aspect of the invention is an apparatus for preparing curved fibers in batches. Views of a preferred embodiment of the apparatus are presented in FIGS. 1-3. Curved bars 1 and 2 are arranged such that their concave surfaces face each other, but leave openings 7 between them. FIGS. 1-3 show two half-cylinders; however, it will be appreciated that more than two curved bars, each forming a curvature less than 90 degrees, may be also be used. Such an arrangement would create more openings. A spacing rod 4 is placed between the curved bars to maintain the openings, and hanging means are used to secure the curved bars to the spacing rod 4. In FIGS. 1-3 the hanging means are two bolts 8 and 9; however, it will be appreciated that other devices such as pins, clips and screws may also be appropriate. A strand of fiber 3 is wrapped around the curved bars in a manner such that the entire fiber surface is in direct contact with the curved-bar surfaces. In this way, the entire fiber strand is exposed to the same curvature. After the curved bars are wrapped with fiber, a supporting means surrounds the apparatus and holds the wrapped fiber in place. The supporting means shown in FIGS. 1-3 is an armature comprising two brackets 5 and 6. An internal portion of each bracket is notched such that the bracket surface is approximately tangent to the wound fiber, thereby minimizing damage. Although the angle shown in FIGS. 1-3 is 30°, it will be appreciated that angles between about 20° to about 50° would be appropriate. It will also be appreciated that the supporting means may comprise other devices such as tubes, triangular frames and the like. The effective external diameter of the half cylinders 1 and 2 is preferably between about 5 mm and 20 mm. The width of the spacing rod 4 is preferably between about 0.1 and 5 mm. The apparatus also comprises means for heating the fibers.

The description of the present invention also encompasses a batch method for preparing curved fibers. The first aspect of the invention is preferably employed to perform the batch method. Basically, a spacing rod 4 and curved bars 1 and 2 are chosen such that the combination provides a desired curvature and openings 7 between the curved bars. The spacing rod 4 is fixed to the curved bars 1 and 2 by hanging means 8 and 9.

A fiber strand 3 is selected. The fiber strand is wrapped around the curved bars 1 and 2 such that the entire strand is in direct contact with the curved-bar surfaces. In this way, all of the fiber is exposed to the same curvature. After wrapping, the supporting means 4 and 5 are placed over the assembly to hold the fiber strand in place.

Next, the apparatus is heated such that the fiber composition is heated to a temperature within its workability-temperature range. After heating, the apparatus is cooled such that the fiber temperature is restored to a temperature below the softening temperature. After cooling, the supporting means 4 and 5 are removed, and the wrapped fiber is cut along openings 7 between the curved bars. After cutting, the rest of the apparatus is disassembled, and the resultant curved fibers are collected.

The second aspect of the invention is an apparatus for preparing curved fibers continuously. A view of a preferred embodiment of the apparatus is presented in FIG. 4. One or more strands of fiber are guided onto a rotating cylindrical screw feeder 10 in a rolling zone 11. As shown in FIG. 4, the means for transporting and guiding the fiber strands to the screw feeder 10 comprises two opposing wheels or rollers 17 that rotate in opposite directions. Those skilled in the art will recognize that other means for transporting and guiding fiber strands may also be appropriate.

Rotation of the screw feeder 10 carries the fiber strands through a heating zone 12 and a cooling zone 13. An unrolling zone 14 at the end of the screw feeder 10 comprises means for guiding the fiber strands away. As pictured in FIG. 4, the means for transporting and guiding the fiber strands away from the screw feeder 10 comprises two opposing wheels or rollers 18 that rotate in opposite directions. Those skilled in the art will recognize that other means for transporting and guiding fiber strands may also be appropriate.

Next, the fiber strands encounter a cutting means 15 at which the fiber strands are chopped into desired lengths. After cutting, the curved fibers 16 are collected (not shown).

A continuous method for preparing curved fibers is also part of the present invention. The second aspect of the invention is employed to perform the continuous method. A cylindrical screw feeder 10 is selected whose diameter between the threads provides a desired curvature. One or more continuous strands of fiber 19 are also selected. For the purposes of this invention, a continuous strand is defined as having an extended length such as a spool containing many meters of continuous filament, thereby making the continuous method practical. Before operating the apparatus, it is first necessary to thread the fiber strands throughout the mechanism. In the rolling zone 11, the fiber strand 19 passes through the opposing wheels 17 and continues between the threads of the screw feeder until it reaches the unrolling zone 14, whereupon the fiber strands 19 are guided off the screw feeder through opposing wheels 18 and then fed into the cutting means 15.

Once the threading process is complete, rotation of the screw feeder 10 commences and a heat source is activated in the heating zone 12 such that the fiber composition reaches a temperature within its workability-temperature range. After becoming malleable and assuming the curvature of the screw feeder 10, the fiber strands 19 leave the heating zone and proceed to the cooling zone, in which the fiber-composition temperature falls below the softening temperature, and the fiber strands 19 lose their malleability. Next, the fiber strand 19 reaches the unrolling zone 14 and is guided away from screw feeder by opposing wheels 18, whereupon it reaches the cutting means 15 and is chopped into desired curved fiber lengths 16. The cut curved fibers 16 are then collected in a container (not shown).

The heating means in both the first and second aspects of the invention may be (but is not limited to) one or more members of the list comprising: an oven, a heating rod, a forced-air heater and an infrared heater.

As mentioned above, the curved fibers may be used as an additive in fluids employed during the construction and treatment of subterranean wells. It will be appreciated that the choice of thermoplastic material in the fibers would be dependent upon the temperature the fluid would encounter during the subterranean-well operation. One would preferably choose a material whose workability-temperature range begins at a temperature higher than that in the subterranean well.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. An apparatus for preparing curved fibers, comprising:
   i. a rotating cylindrical screw feeder for carrying one or more strands of a thermoplastic fiber;
   ii. a rolling zone comprising means for transporting and guiding the one or more strands of a thermoplastic fiber having a composition onto the screw feeder;
   iii. a heating zone comprising means for heating the fiber as the fiber is carried by the screw feeder through the heating zone, wherein the fiber composition reaches a temperature with its workability-temperature range;
   iv. a cooling zone comprising means for cooling the fiber as the fiber is carried by the screw feeder through the cooling zone, wherein the fiber composition is restored to a temperature below its softening temperature;
   v. an unrolling zone comprising means for guiding and transporting one or more strands of fiber away from the screw feeder; and
   vi. means for cutting the fiber,
wherein the fiber is selected from the group consisting of acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile.

2. The apparatus of claim 1, wherein the means for heating the apparatus is one or more members of the list consisting of an oven, a heating rod, a forced-air heater and an infrared heater.

3. The apparatus of claim 1, wherein the means for heating the apparatus is an oven, an infrared heater, or combination thereof.

4. The apparatus of claim 1, wherein the heating zone renders the fiber malleable thus assuming a curvature of the screw feeder.

5. The apparatus of claim 4, wherein the cooling zone cools the fiber to a temperature below a temperature wherein the fiber is no longer malleable and therefore maintains the curvature of the screw feeder.

6. The apparatus of claim 1, wherein the one or more strands of a thermoplastic fiber is more than one strand.

7. An apparatus comprising:
   i. one or more strands of a thermoplastic fiber;
   ii. a rotating cylindrical screw feeder for carrying the one or more strands of a thermoplastic fiber;
   iii. a rolling zone comprising means for transporting and guiding the one or more strands of a thermoplastic fiber having a composition onto the screw feeder;
   iv. a heating zone comprising means for heating the fiber as the fiber is carried by the screw feeder through the heating zone;
   v. a cooling zone comprising means for cooling the fiber as the fiber is carried by the screw feeder through the cooling zone; and
   vi. an unrolling zone comprising means for guiding and transporting one or more strands of fiber away from the screw feeder.

8. The apparatus of claim 7, wherein the means for heating the apparatus is an oven, an infrared heater, or combination thereof.

9. The apparatus of claim 7, wherein the heating zone renders the fiber malleable thus assuming a curvature of the screw feeder.

10. The apparatus of claim 9, wherein the cooling zone cools the fiber to a temperature below a temperature wherein the fiber is no longer malleable and maintains the curvature of the screw feeder.

11. The apparatus of claim 7, wherein the one or more strands of a thermoplastic fiber is more than one strand.

12. The apparatus of claim 7, wherein the one or more strands of a thermoplastic fiber is threaded around the rotating cylindrical screw feeder.

13. The apparatus of claim 7, wherein fiber comprised in the one or more strands of a thermoplastic fiber have a diameter between 200 and 280 micrometers.

14. The apparatus of claim 7, further comprising a means for cutting the fiber.

15. The apparatus of claim 14, wherein the fiber has a length of between 5 mm to 20 mm after cutting.

16. An apparatus comprising:
i. one or more strands of a thermoplastic fiber;
ii. a rolling zone comprising means for transporting and guiding the one or more strands of a thermoplastic fiber;
iv. a heating zone;
v. a cooling zone;
vi. an unrolling zone comprising means for guiding and transporting one or more strands of fiber away from the screw feeder; and
ii. a rotating cylindrical screw feeder extending through and for carrying the one or more strands of a thermoplastic fiber the rolling zone, the heating zone, the cooling zone and the unrolling zone.

17. The apparatus of claim 16, wherein the heating zone comprising means for heating the fiber selected from an oven, an infrared heater, or combination thereof.

18. The apparatus of claim 16, wherein the heating zone renders the fiber malleable thus assuming a curvature of the screw feeder as the one or more strands of a thermoplastic fiber is carried by the screw feeder through the heating zone.

19. The apparatus of claim 18, wherein the cooling zone cools the fiber to a temperature below a temperature wherein the fiber is no longer malleable and maintains the curvature of the screw feeder as the one or more strands of a thermoplastic fiber is carried by the screw feeder through the cooling zone.

20. The apparatus of claim 16, wherein the one or more strands of a thermoplastic fiber is more than one strand.

\* \* \* \* \*